No. 610,067. Patented Aug. 30, 1898.
B. G. LAMME.
INDUCTION MOTOR.
(Application filed July 22, 1897.)
(No Model.) 2 Sheets—Sheet 1.

WITNESSES
Ethan I. Dodds
H. C. Tener

INVENTOR
Benjamin G. Lamme
BY Wesley G. Carr
ATTORNEY.

No. 610,067.  
Patented Aug. 30, 1898.
B. G. LAMME.
INDUCTION MOTOR.
(Application filed July 22, 1897.)
(No Model.)  
2 Sheets—Sheet 2.
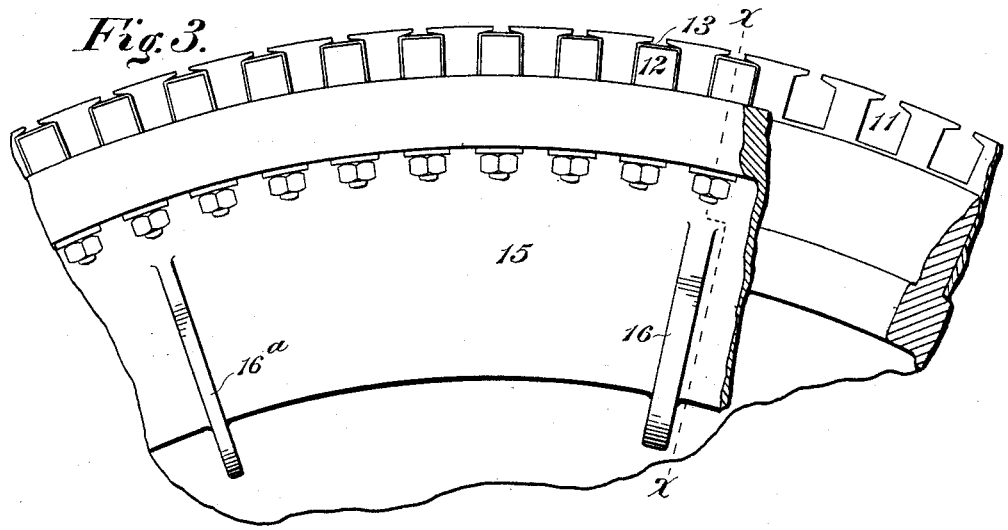
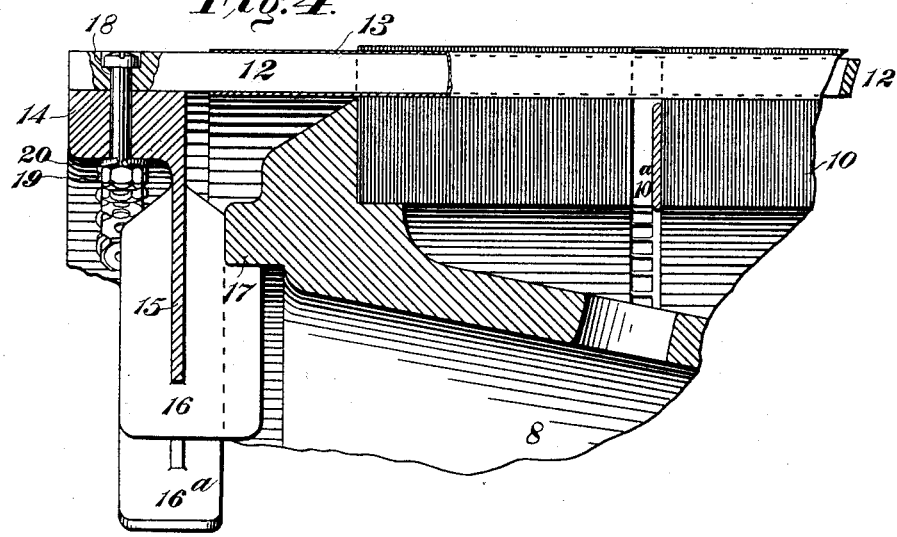
WITNESSES:  
Ethan J. Dodds  
H. C. Tener
INVENTOR  
Benjamin G. Lamme  
BY  
Wesley G. Carr  
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

INDUCTION-MOTOR.

SPECIFICATION forming part of Letters Patent No. 610,067, dated August 30, 1898.

Application filed July 22, 1897. Serial No. 645,511. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Induction-Motors, (Case No. 748,) of which the following is a specification.

My invention relates to alternating-current electric motors, and particularly to that class known as "induction-motors" and usually operated by two or more currents differing in phase.

The object of my invention is to provide a motor of the class above referred to which shall be operated without the use of collecting rings and brushes and which shall be simple and compact in construction and durable and efficient in operation.

Figure 1:
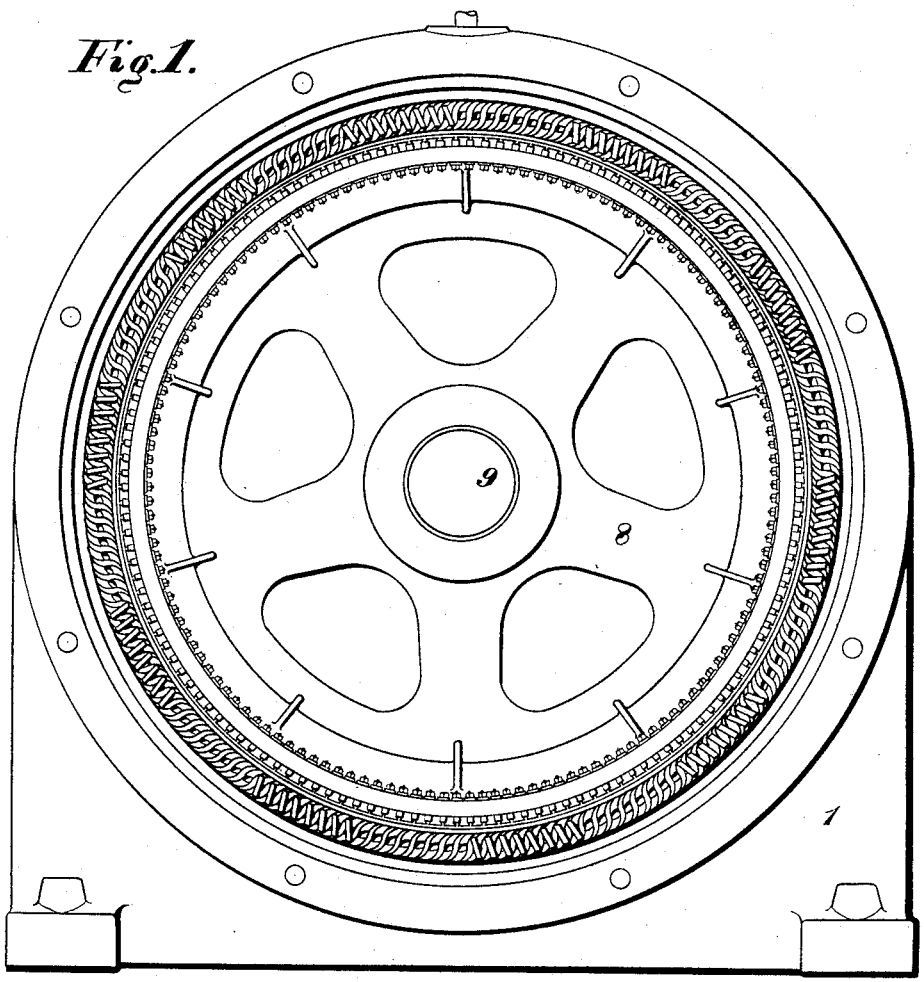
Figure 2:
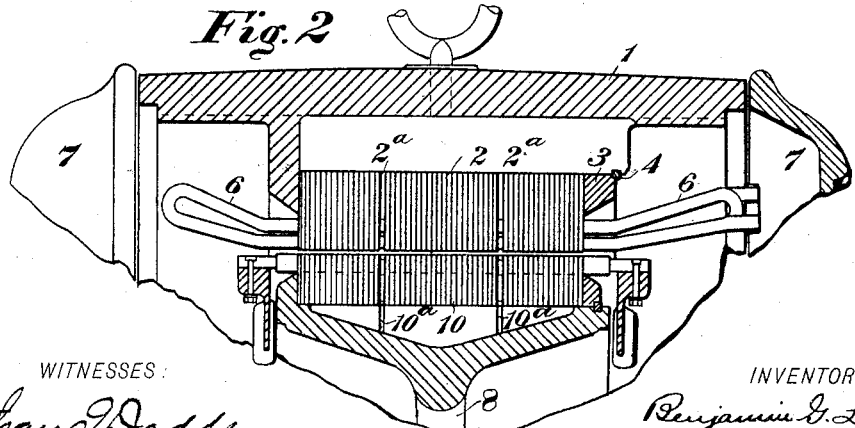

In the accompanying drawings, Figure 1 is an end elevation of a motor constructed in accordance with my invention, the end plates or covers being removed. Fig. 2 is a detail sectional view of a portion of the machine shown in Fig. 1, portions of the end covers being also shown. Fig. 3 is an end elevation of a portion of the secondary member of the motor, and Fig. 4 is a sectional view taken on line $x\ x$ of Fig. 3.

The details of construction illustrated in the drawings are as follows:

1 is the main cast-metal frame of the machine, having a cylindrical internal conformation in which is mounted the laminated core 2. This core is preferably clamped in position by means of an annular plate 3 and spring-ring 4, substantially in the manner set forth in the patent to E. E. Nolan, No. 582,481. The core is provided with ventilating-ducts $2^a$, as is usual, and with slots, in which are located the coils 6, which are connected to each other and to the external circuit as may be found necessary or desirable in view of the number of poles desired and the number of phases of current utilized.

7 are end caps or plates which are bolted or otherwise fastened to the frame 1.

The secondary member of the motor in the form of machine shown comprises a spider 8, mounted rigidly upon the shaft 9 and provided on its exterior periphery with a laminated core 10. This core has ribbed spacing-plates $10^a$, arranged at suitable intervals, so as to provide ventilating-ducts. The core is also provided with longitudinal slots 11, in which are located bar conductors 12, each of which is surrounded by an insulating-sheath 13 and projects some distance beyond the ends of the core.

It is well known that satisfactory operation of motors of this general class necessitates the employment of a greater resistance in the secondary circuit than is afforded by the bar conductors and end connectors having substantially the same cross-section and composition. It has been proposed to rigidly and permanently connect the ends of the conductor-bars by rings or plates of comparatively high resistance, which are either retained permanently in circuit or are short-circuited when the motor has reached normal speed. My present invention contemplates the employment of resistance-rings of special construction, which may be retained permanently in circuit, which promote ventilation, and are not separated from the conductor-bars by unequal expansion of the metals employed due to changes in temperature. I employ a resistance-ring 14 on each end of the motor, the main portion of which is of considerable thickness and which comprises, in addition to this main portion, a comparatively thin annular plate 15, which projects inwardly toward the shaft of the machine at substantially right angles to the main portion. This plate 15 is provided with radial blades 16 and $16^a$, preferably alternating in position, the former being thicker than the latter and also of greater width. The portions of the blades 16 which project inwardly toward the spider 8 are provided with shoulders which receive the outer flanged portion 17 of the spider 18, thus serving to center the ring and to assist in retaining it in position. Each of the rings 14 is fastened to the inner sides of the outer ends of the bar conductors 12 by means of bolts 18 and nuts 19, the bars being countersunk to receive the heads of the bolts, as is clearly indicated in Fig. 4. Spring-washers 20 may also be employed between the rings 14 and the nuts 19, in order to provide for a greater degree of yielding of the parts when changes in temperature effect unequal expansion of the metals employed and at the same time insure a close contact between the rings 14 and the conductor-bars 12. I do not claim, broadly, the use of spring-washers in this connection, however, since such use is not original with me. The blades 16 and 16$^a$ serve as fans to set up currents of air which circulate through and around the cores of the machine and between the conductors, and thus keep the temperature down to a safe limit.

While I have illustrated and described specific details of construction, I desire it to be understood that such details may be varied without departing from the spirit and scope of my invention.

I claim as my invention—

1. In an alternating-current induction-motor, a secondary member comprising a spider, a laminated, slotted core, bar conductors located in the core-slots and projecting beyond the ends of the same, and resistance-rings provided with ventilating and centering blades which are bolted to the inner sides of the projecting ends of the bar conductors, and have shoulders bearing against the adjacent portion of the spider.

2. In an induction alternating-current motor, a secondary member comprising a spider, a laminated core provided with slots, bar conductors located in said slots and projecting beyond the ends of the same and resistance-rings fastened to the inner sides of the projecting ends of the conductor-bars by means of bolts, nuts and spring-washers, and provided with ventilating-blades some of which have shoulders engaging the adjacent portion of the spider.

3. In an alternating-current induction-motor, a secondary member comprising a spider, a laminated core mounted thereon and provided with slots, bar conductors located in said slots and projecting beyond the ends of the same, and resistance-rings bolted to the inner sides of the ends of the conductor-bars and having an inwardly-projecting plate provided with ventilating-blades some of which have shoulders engaging the adjacent portion of the spider.

In testimony whereof I have hereunto subscribed my name this 20th day of July, A. D. 1897.

BENJ. G. LAMME.

Witnesses:
WESLEY G. CARR,
H. C. TENER.